US009793707B2

United States Patent
Torres et al.

(10) Patent No.: US 9,793,707 B2
(45) Date of Patent: Oct. 17, 2017

(54) FAST TRANSIENT PRECISION POWER REGULATION APPARATUS

(71) Applicant: TEXAS INSTRUMENTS INCORPORATED, Dallas, TX (US)

(72) Inventors: Hector Torres, McKinney, TX (US); Charles Parkhurst, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 448 days.

(21) Appl. No.: 13/903,736

(22) Filed: May 28, 2013

(65) Prior Publication Data

US 2014/0355161 A1    Dec. 4, 2014

(51) Int. Cl.
| | | |
|---|---|---|
| H02H 9/02 | (2006.01) | |
| G05F 1/573 | (2006.01) | |
| G05F 1/575 | (2006.01) | |
| H02H 9/00 | (2006.01) | |

(52) U.S. Cl.
CPC .............. H02H 9/02 (2013.01); G05F 1/575 (2013.01); G05F 1/5735 (2013.01); *H02H 9/001* (2013.01)

(58) Field of Classification Search
CPC ..... H03K 17/0822; H02H 9/025; G05F 1/573
USPC ...................................................... 361/93.9
See application file for complete search history.

(56) References Cited

U.S. PATENT DOCUMENTS

| | | | | |
|---|---|---|---|---|
| 5,850,139 | A * | 12/1998 | Edwards ....................... 323/280 |
| 6,424,131 | B1 * | 7/2002 | Yamamoto ......... H03K 17/0822 |
| | | | | 323/282 |
| 6,700,361 | B2 * | 3/2004 | Gregorius ............... G05F 1/575 |
| | | | | 323/274 |
| 8,169,202 | B2 | 5/2012 | Chen | |

(Continued)

FOREIGN PATENT DOCUMENTS

| | | |
|---|---|---|
| CN | 1722560 A | 1/2006 |
| CN | 101256421 A | 9/2008 |

(Continued)

OTHER PUBLICATIONS

European Search Report and Examination Report, Application No. 14804381.3-1806 / 3005012 PCT/US2014039818 dated Jan. 24, 2017, 9 pages.

(Continued)

*Primary Examiner* — Ronald W Leja
(74) *Attorney, Agent, or Firm* — Gregory J. Albin; Charles A. Brill; Frank D. Cimino (57) ABSTRACT

Apparatus disclosed herein implement a fast transient precision current limiter such as may be included in an electronic voltage regulator. The current limiter includes two current sense element/current clamp control loops. A fast response time control loop first engages and clamps a current spike. A precision control loop then engages to more accurately clamp the output current to a programmed set point. The precision clamping loop includes an inner loop to linearize the precision current sense element. The inner loop forces the drain-to-source voltage (VDS) of the precision (Continued)

sense element to track the VDS of the regulator pass element. A more precise clamping operation results. Overall speed is not sacrificed as the fast response time clamping loop operates in parallel to protect circuitry while the precision clamping loop engages.

18 Claims, 4 Drawing Sheets

(56) References Cited

U.S. PATENT DOCUMENTS

| | | | |
|---|---|---|---|
| 8,213,147 B2* | 7/2012 | Maher | H02H 9/004 361/93.1 |
| 8,232,781 B2* | 7/2012 | Marino | G01R 19/16552 323/271 |
| 2006/0012932 A1* | 1/2006 | Kitagawa | 361/93.1 |
| 2006/0043945 A1 | 3/2006 | Sohn et al. | |
| 2006/0133000 A1 | 6/2006 | Kimura | |
| 2008/0165465 A1* | 7/2008 | Rallabandi | G05F 1/573 361/93.9 |
| 2008/0265852 A1 | 10/2008 | Imura | |
| 2010/0013448 A1* | 1/2010 | Motz | 323/280 |
| 2010/0213908 A1 | 8/2010 | Chen | |
| 2012/0038332 A1 | 2/2012 | Lin | |
| 2012/0242312 A1 | 9/2012 | Heng | |

FOREIGN PATENT DOCUMENTS

| | | |
|---|---|---|
| CN | 101295928 A | 10/2008 |
| CN | 101739054 A | 6/2010 |
| CN | 102830744 A | 12/2012 |
| JP | 03242942 A * | 10/1991 |
| RU | 2256999 | 7/2005 |
| WO | WO9531762 | 11/1995 |
| WO | WO2012003597 | 1/2012 |

OTHER PUBLICATIONS

First Office Action, Chinese Patent Application No. 2014800290676, mailed Aug. 17, 2016, 30 pages.

Second Office Action, Search Report, Chinese Patent Application No. 2014800290676, dated Jun. 5, 2017, 33 pages.

* cited by examiner

FAST TRANSIENT PRECISION POWER REGULATION APPARATUS

TECHNICAL FIELD

Structures described herein relate to electronic circuits, including current-limiting circuits and electronic power supply systems.

BACKGROUND INFORMATION

Some electronic power supply regulators may include over-current protection circuitry. Over-current protection may prevent catastrophic failure of regulator components, particularly power transistor output stages, in the event of a short circuit or a heavy loading condition at the regulator output.

Some power supply regulators may utilize a sense transistor to sense an overdrive condition and a current clamp to temporarily reduce the drive signal to the power output stage while the overdrive condition is present. However, sense transistor-based current clamps traditionally have poor direct current (DC) accuracy. Inaccuracies may be due to a combination of channel length modulation effects, sense element to pass element matching, and process, supply, and/or temperature (PVT) variations.

SUMMARY OF THE INVENTION

Apparatus disclosed herein implement a fast transient precision current limiter such as may be included in an electronic voltage regulator. The current limiter includes two current sense element/current clamp control loops. A fast response time control loop first engages and clamps a current spike. A precision control loop then engages to more accurately clamp the output current to a programmed set point.

Each of the control loops includes a current sense element coupled to a voltage regulation control input. Voltage regulation control circuitry senses the over-current condition as a voltage drop at the voltage regulator output terminals. The voltage regulation control circuitry responds by increasing the magnitude of a voltage regulation control drive signal to a pass element through which current from the voltage regulator flows to the load. Thus, large increases in the voltage regulation control drive signal are indicative of an over-current condition. The sense elements associated with the two current-limiting control loops sense large increases in the voltage regulation control drive signal as over-current conditions.

The precision clamping loop includes an inner loop to linearize the precision current sense element. The inner loop forces the drain-to-source voltage (VDS) of the precision sense element to track the VDS of the regulator pass element. The linearizing loop includes an element matching circuit which may, in some embodiments, be implemented as a signal comparator such as an operational transconductance amplifier (OTA). The comparator senses the regulator output voltage at a comparator input and generates an output signal which, when fed back to a second comparator input, causes the second comparator input voltage to track the regulator output voltage.

The linearization loop effectively causes the precision current sense element to follow the VDS of the regulator output pass element. The comparator generates a more accurate precision sense signal to be compared to a precision reference source representing the selected clamping point. A more precise clamping operation results. Overall speed is not sacrificed as the fast response time clamping loop operates in parallel to protect circuitry while the precision clamping loop engages.

DETAILED DESCRIPTION

Figure 1:
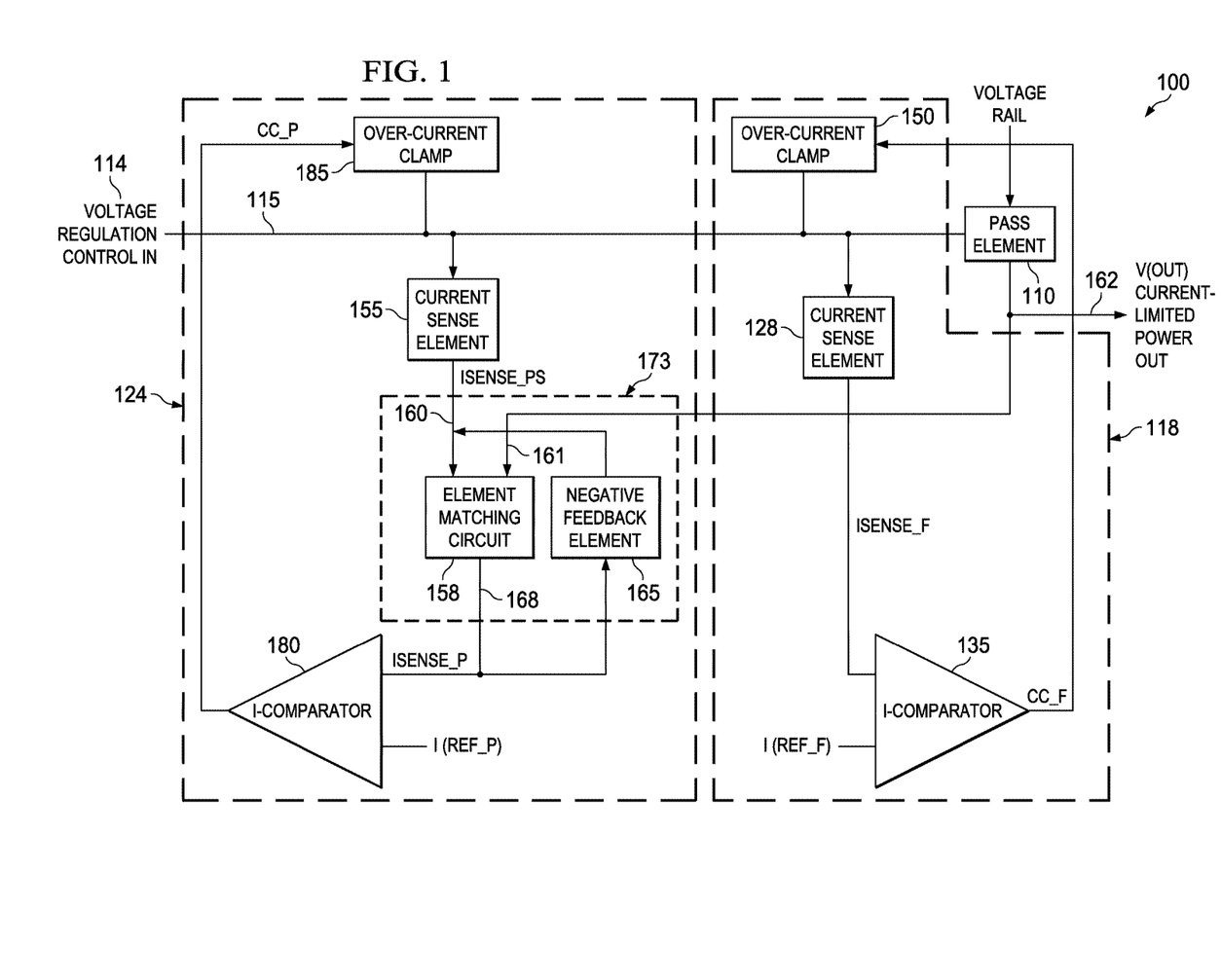
FIG. 1 is a block diagram of an electronic current-limiting apparatus according to various example embodiments of the invention.
Figure 2:
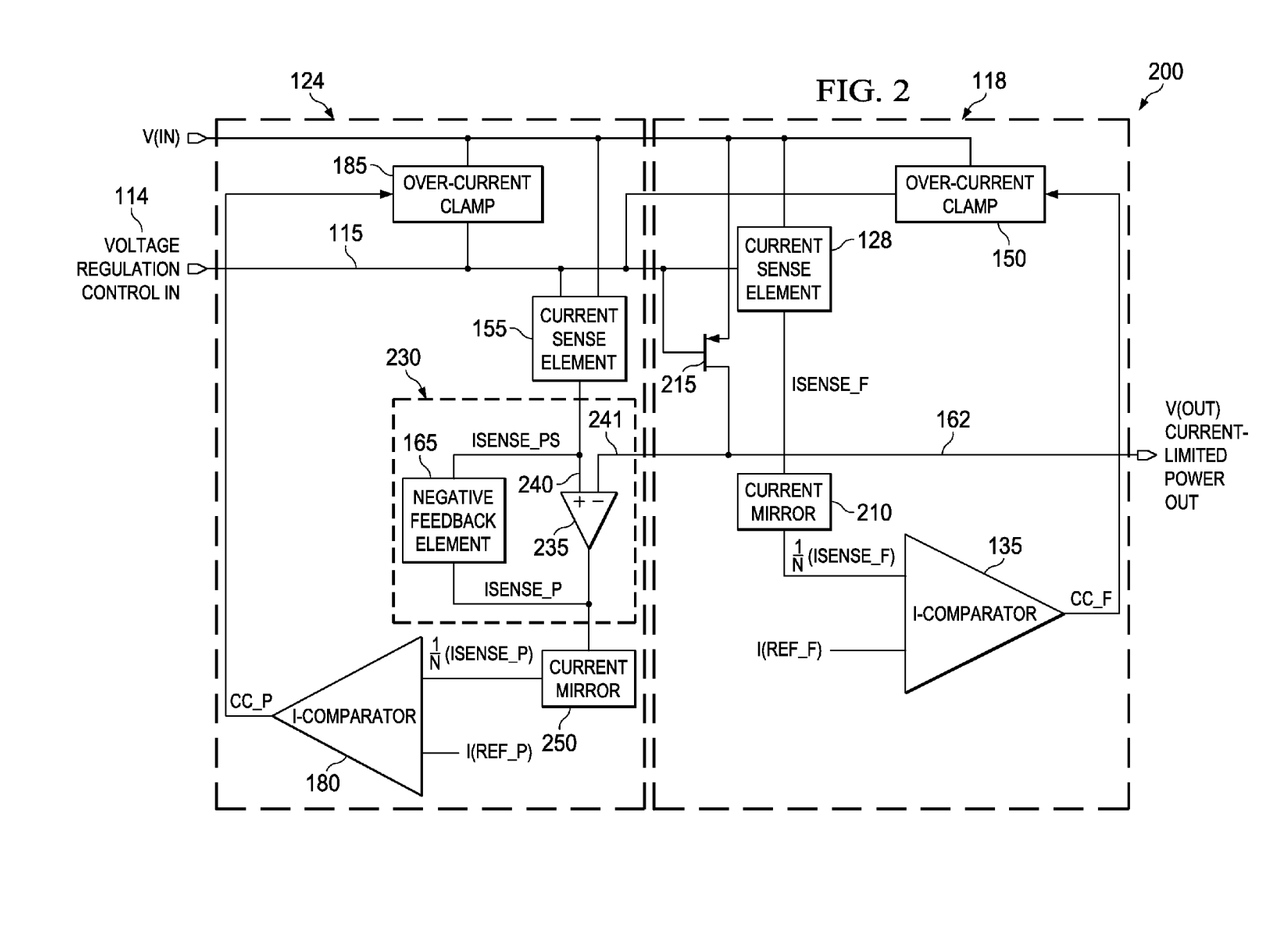
FIG. 2 is a detailed block diagram of an electronic current-limiting apparatus according to various example embodiments.

FIGS. 1 and 2 are block diagrams of current-limiting apparatus 100 and 200 according to various example embodiments of the invention. The current-limiting apparatus 100 and 200 include a pass element 110. The pass element 110 is embodied as a power MOSFET 215 in the current-limiting apparatus 200. The pass element 110 receives a voltage regulation control input signal 114 on a voltage regulation control input path 115. The pass element 110 allows a magnitude of current flow through a current channel of the pass element 110 that is proportional to the magnitude of the voltage regulation control input signal 114. The current-limiting apparatus 100 and 200 also both include a fast transient feedback circuit 118 and a precision feedback circuit 124 operating in parallel.

The fast transient feedback circuit 118 is communicatively coupled to the voltage regulation control input path 115. The fast transient feedback circuit 118 receives the voltage regulation control input signal 114 and decreases the magnitude of the voltage regulation control input signal 114 on the path 115 in an over-current condition. The fast transient feedback circuit 118 includes a fast transient current sense element 128 communicatively coupled to the voltage regulation control input path 115. The fast transient current sense element 128 receives the voltage regulation control input signal 114 and generates a fast transient feedback sense current ISENSE_F. ISENSE_F is proportional to the magnitude of current flow through the pass element 110.

At FIG. 1, the fast transient feedback circuit 118 of the current-limiting apparatus 100 also includes a first current comparator 135 communicatively coupled to the output of the fast transient current sense element 128. The first current comparator 135 compares ISENSE_F to a first reference current I(REF_F) and generates a first current clamp control signal CC_F.

Some embodiments of the fast transient feedback circuit 118 may include a current mirror 210 as depicted in FIG. 2 in conjunction with the current-limiting apparatus 200. The current mirror 210 is communicatively coupled between the fast transient current sense element 128 and the first current comparator 135. The current mirror 210 generates a first attenuated sense current of ratio 1/N(ISENSE_F) for comparison to the first reference current I(REF_F).

The fast transient feedback circuit 118 also includes a first over-current clamp 150 communicatively coupled to an output of the first current comparator 135. The first over-current clamp 150 receives the first current clamp control signal CC_F. Responsive to CC_F, the first over-current clamp 150 conducts to clamp the voltage regulator control input path 115 and to decrease the magnitude of the voltage regulation control input signal 114. The magnitude of current flow through the pass element 110 associated with the over-current condition decreases as a result.

The current-limiting apparatus 100 and 200 also include a precision feedback circuit 124, as previously mentioned. The precision feedback circuit 124 is communicatively coupled to the voltage regulation control input path 115. The precision feedback circuit 124 receives the voltage regulation control input signal 114 as representative of the magnitude of current flow through the pass element 110/pass transistor 215. The precision feedback circuit 124 operates in parallel with the fast transient feedback circuit 118 to decrease the magnitude of the voltage regulation control input signal 114 in an over-current condition. Although slower to react, the precision feedback circuit 124 may more accurately control the over-current condition than control provided by the fast transient feedback circuit 118. The precision feedback circuit 124 effects more precise control by correcting for one or more component characteristic mismatches between the pass element 110/pass transistor 215 and one or more components of the precision feedback circuit 124.

The precision feedback circuit 124 includes a precision current sense element 155. In some embodiments, the precision current sense element 155 may be implemented using a geometrical size that is an integer semiconductor finger fraction of the pass element 110/pass transistor 215. Doing so may enhance component characteristic matching between the precision current sense element 155 and the pass element 110/pass transistor 215.

The precision current sense element 155 is communicatively coupled to the voltage regulation control input path 115. The precision current sense element 155 receives the voltage regulation control input signal 114 and generates a precision feedback current sense signal ISENSE_PS. ISENSE_PS is proportional to the magnitude of current flow through the pass element 110/pass transistor 215.

At FIG. 1, the precision feedback circuit 124 of the current-limiting apparatus 100 also includes an element matching circuit 158. A first input 160 of the element matching circuit 158 is communicatively coupled to the output of the precision current sense element 155. A second input 161 is communicatively coupled to a voltage regulation output path 162. A negative feedback element 165 is communicatively coupled between an output 168 of the element matching circuit 158 and the first input 160. The inner feedback loop 173 so formed causes a signal at the first input 160 to track the voltage at the regulation output path 162. One or more component characteristic mismatches between the pass element 110 and the precision current sense element 155 are compensated via the inner feedback loop 173.

Turning again to FIG. 2, the current-limiting apparatus 200 includes a component characteristic-matching inner loop 230 analogous to the loop 173 of the current-limiting apparatus 100. The apparatus 200 includes a signal comparator 235 with a first input 240 communicatively coupled to an output of the precision current sense element 155. A second input 241 is communicatively coupled to the voltage regulation output path 162. The precision feedback circuit 124 also includes a negative feedback element 165 communicatively coupled between an output of the signal comparator 235 and the first input 240. The inner loop 230 causes a signal at the first input 240 to track the voltage at the regulator output path 162. Doing so compensates for component characteristic mismatches between the pass transistor 215 and the precision current sense element 155.

The signal comparator 235 generates a precision feedback sense current ISENSE_P. Some embodiments of the precision feedback circuit 124 may include a current ratio apparatus 250 coupled to the output of the signal comparator 235. The current ratio apparatus 250 divides ISENSE_P by a factor N to yield a second attenuated sense current 1/N (ISENSE_P). The current ratio apparatus 250 may be implemented using one or more current mirrors, geometrical finger size ratios between interconnected stages, and other methods as are well-known in the art.

The precision feedback circuit 124 also includes a second current comparator 180. The second current comparator 180 is communicatively coupled to an output 168 of the element matching circuit 158 in the case of the current-limiting apparatus 100 of FIG. 1. The second current comparator 180 is communicatively coupled to an output of the signal comparator 235 or to the output of the current ratio apparatus 250 in the case of the current-limiting apparatus 200 of FIG. 2. Either the precision feedback sense current ISENSE_P or the second attenuated feedback sense current 1/N(ISENSE_P), as appropriate, is compared to a second reference current I(REF_P). A second current clamp control signal CC_P is generated at the output of the second current comparator 180 in the event of an over-current condition.

The precision feedback circuit 124 also includes a second over-current clamp 185 communicatively coupled to the second current comparator 180. The second over-current clamp 185 receives the second current clamp control signal CC_P and decreases the magnitude of the voltage regulation control input signal 114. The magnitude of over-current flow through the pass element 110 of the current-limiting apparatus 100 (FIG. 1) and/or through the pass transistor 215 of the current-limiting apparatus 200 (FIG. 2) is decreased as a result.

Figure 3:
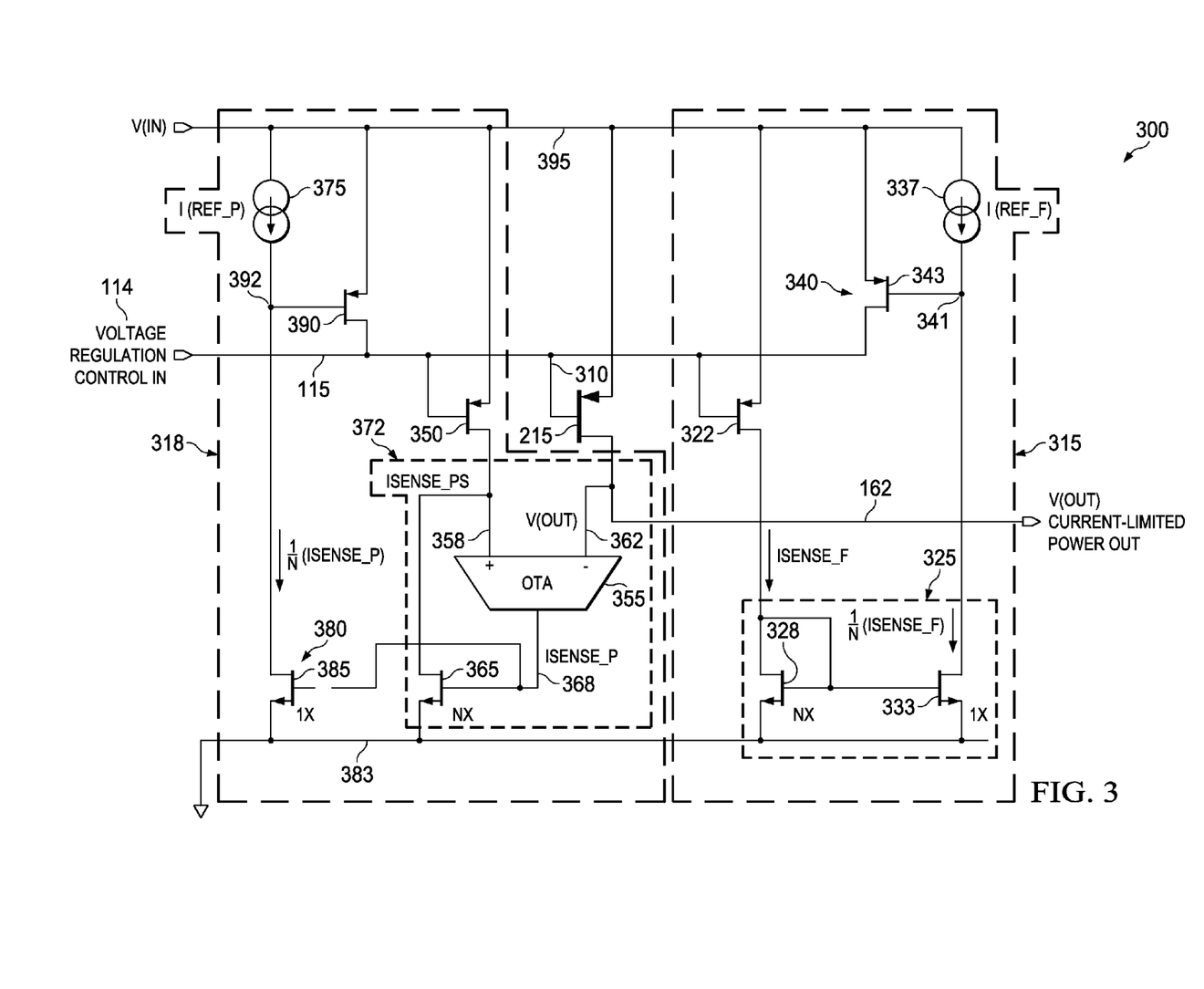
FIG. 3 is a circuit diagram of an electronic current-limiting apparatus according to various example embodiments.

FIG. 3 is a circuit diagram of an electronic current-limiting apparatus 300 according to various example embodiments. The current-limiting apparatus 300 includes a pass transistor 215. The pass transistor 215 receives a voltage regulation control input signal 114 at a gate terminal 310. The pass transistor 215 allows a magnitude of current flow through a current channel associated with the pass transistor 215 that is proportional to the magnitude of the voltage regulation control input signal 114. The current-limiting apparatus 300 also includes a fast transient feedback circuit 315 and a precision feedback circuit 318. The fast transient feedback circuit 315 and the precision feedback circuit 318 operate in parallel to first control the fastest rise-time current transients and then to more precisely control over-current as the precision feedback circuit 318 engages.

The fast transient feedback circuit 315 is communicatively coupled to the voltage regulation control input path 115 to receive the voltage regulation control input signal 114. The fast transient feedback circuit 315 interprets the magnitude of current flow through the pass transistor 215 from the magnitude of the voltage regulation control input signal 114. The fast transient feedback circuit 315 decreases the magnitude of the voltage regulation control input signal 114 in an over-current condition, thereby decreasing drive to the pass transistor 215 and alleviating the over-current condition.

The fast transient feedback circuit 315 includes a fast transient current sense transistor 322 gate-coupled to the voltage regulation control input path 115. The current sense transistor 322 receives the voltage regulation control input signal 114 and generates a fast transient sense current ISENSE_F. ISENSE_F is proportional to the magnitude of current flow through the pass transistor 215. In some embodiments, the fast transient feedback circuit 315 also includes an N-ratio current mirror 325 communicatively coupled to the fast transient current sense transistor 322. The N-ratio current mirror 325 receives ISENSE_F at a current mirror source transistor 328.

The current mirror 325 generates a first attenuated sense current 1/N(ISENSE_F) through a current channel of a current mirror output transistor 333. Either ISENSE_F, or 1/N(ISENSE_F) in the case of a current mirror 325 implementation, is compared to a first reference current I(REF_F). The first reference current I(REF_F) is generated by a first reference current source 337. The first current reference source 337 in coupled in series with the current channel of the current mirror output transistor 333.

The fast transient feedback circuit 315 further includes a first over-current clamp transistor 340. The first over-current clamp transistor 340 is gate-coupled to a node 341 between the first reference current source 337 and the current channel of the current mirror output transistor 333. In an over-current condition, the first attenuated sense current 1/N(ISENSE_F) exceeds the first reference current I(REF_F), causing the gate 343 of the clamp transistor 340 to be pulled low. The first over-current clamp transistor 340 consequently conducts and clamps the voltage regulation control input signal 114 on the input path 115. The gate 310 of the pass transistor 215 is clamped such as to decrease the magnitude of current flow through the pass transistor 215 and to thereby alleviate the over-current condition.

The current-limiting apparatus 300 also includes a precision feedback circuit 318, as previously mentioned. The precision feedback circuit 318 is communicatively coupled to the voltage regulation control input path 115 to receive the voltage regulation control input signal 114. The precision feedback circuit 318 decreases the magnitude of the voltage regulation control input signal 114 in an over-current condition more accurately than control provided by the fast transient feedback circuit 315. The precision feedback circuit 318 operates more accurately by compensating for one or more component characteristic mismatches between the pass transistor 215 and the precision feedback circuit 318.

The precision feedback circuit 318 includes a precision current sense transistor 350 communicatively coupled to the voltage regulation control input path 115. The precision current sense transistor 350 receives the voltage regulation control input signal 114 as representative of the magnitude of current flow through the pass transistor 215. The precision current sense transistor 350 generates a precision feedback current sense signal ISENSE_PS proportional to the magnitude of current flow through the pass transistor 215.

In some embodiments, the precision current sense transistor 350 may be fabricated to result in a geometrical size that is an integer semiconductor finger fraction of the pass transistor 215. Doing so may further enhance characteristic matching between the two devices.

The precision feedback circuit 318 also includes an OTA 355. A first input 358 of the OTA 355 is communicatively coupled to an output of the precision current sense transistor 350. A second input 362 of the OTA 355 is communicatively coupled to a voltage regulation output path 162. The OTA 355 generates a precision feedback sense current ISENSE_P on output 368.

The precision feedback circuit 318 also includes a characteristic matching feedback transistor 365. The feedback transistor 365 is gate-coupled to the output 368 of the OTA and is current channel coupled to the first OTA input 358. The OTA 355 and the feedback transistor 365 operate as an inner component matching loop 372 within the precision feedback circuit 318. The inner matching loop 372 causes a signal at the first OTA input 358 to track the regulator output voltage and to thereby compensate for one or more component characteristic mismatches between the pass transistor 215 and the precision current sense transistor 350.

The precision feedback circuit 318 also includes a second reference current source 375. The second reference current source 375 generates a second reference current I(REF_P). A precision loop transistor 380 is gate-coupled to the output 368 of the OTA 355 and is channel-coupled between a voltage rail 383 and the second reference current source 375. The precision loop transistor 380 receives ISENSE_P at its gate 385 and generates a second attenuated sense current 1/N(ISENSE_P) for comparison to the second reference current I(REF_P).

The precision feedback circuit 318 further includes a second over-current clamp transistor 390. The clamp transistor 390 is gate-coupled to a node 392 between the second reference current source 375 and the current channel of the precision loop transistor 380. The clamp transistor 390 is driven to conduct during an over-current condition when the second attenuated sense current 1/N(ISENSE_P) is greater than the second reference current I(REF_P), causing the node 392 to be pulled low. Conduction of the clamp transistor 390 decreases the magnitude of the voltage regulation control input signal 114. Excess current flow through the pass transistor 215 associated with the over-current condition decreases as a result.

It is noted that the current-limiting apparatus 300 as described and shown in FIG. 3 is implemented with PMOS and NMOS transistors appropriate to the voltage rails V(IN) 395 and ground 383. Analogous combinations of NMOS and PMOS transistors appropriate to other voltage rail pairs, and transistor types other than MOSFET (e.g., bipolar transistor types) are contemplated by the instant disclosure.

Figure 4:
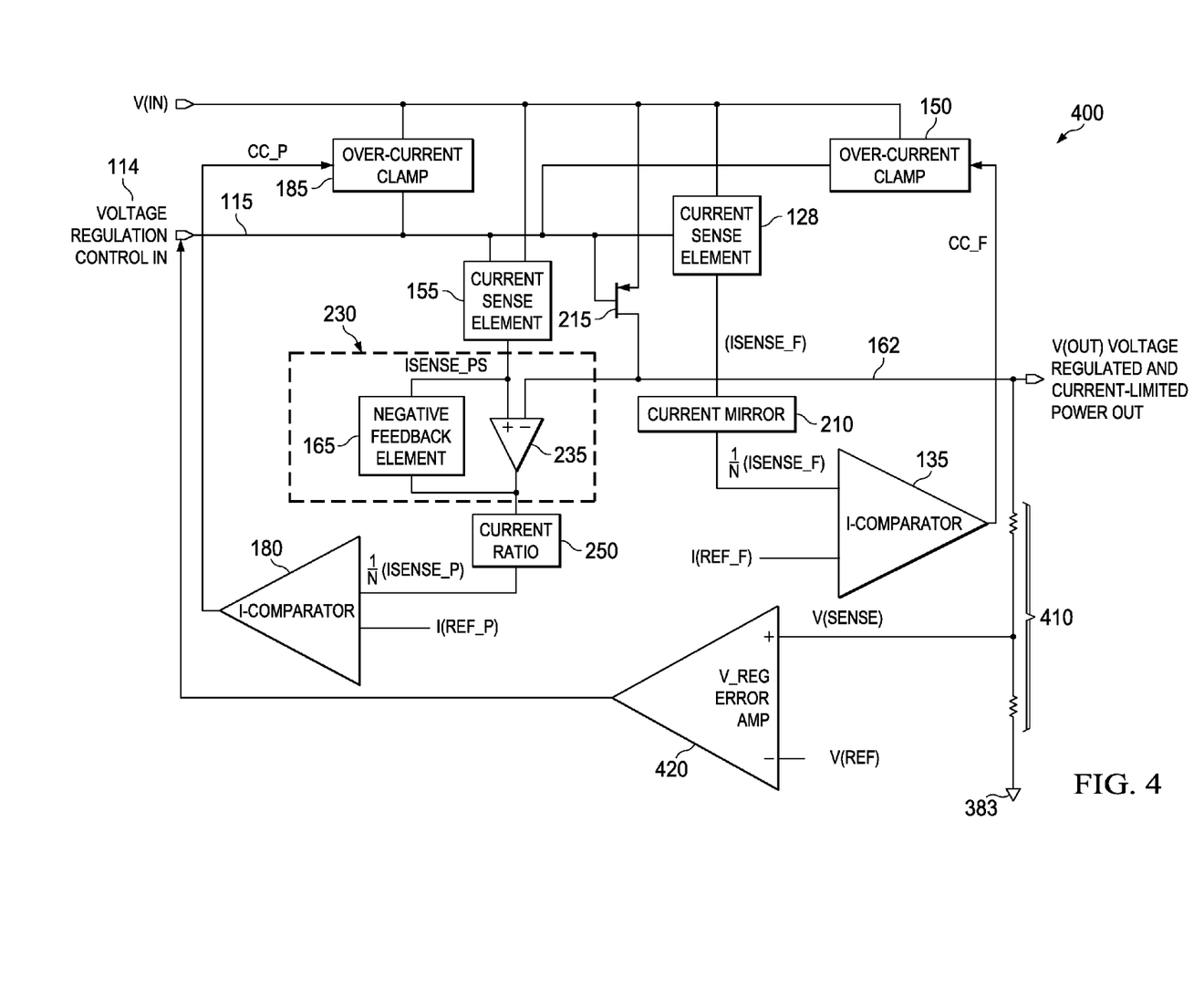
FIG. 4 is a block diagram of a current-limited voltage regulator according to various example embodiments.

FIG. 4 is a block diagram of a current-limited voltage regulator 400 according to various example embodiments. The current-limited voltage regulator 400 includes the elements associated with the current-limiting apparatus 200, arranged as described above with reference to FIG. 2. To avoid redundancy, the latter description is not repeated here.

The current-limited voltage regulator 400 also includes a voltage divider 410. The voltage divider 410 is communicatively coupled between an output 162 of the voltage regulator 400 and a voltage rail 383 to provide an output voltage sense signal V(SENSE). The voltage regulator 400 also includes a voltage regulation error amplifier 420 communicatively coupled to the voltage divider 410. The error amplifier 420 receives V(SENSE), compares V(SENSE) to a reference voltage input V(REF), and generates the voltage regulation control input signal 114.

Apparatus described herein may be useful in applications other than current-limited voltage regulation apparatus. Examples of the electronic current-limiting apparatus 100, 200, and 300 and of the current-limited voltage regulation apparatus 400 are intended to provide a general understanding of the structures of various embodiments. They are not intended to serve as complete descriptions of all elements and features of apparatus and systems that might make use of these structures.

The various embodiments may be incorporated into semiconductor analog and digital circuits for use in receptacle power converters, electronic circuitry used in computers, communication and signal processing circuitry, single-processor or multi-processor modules, single or multiple embedded processors, multi-core processors, data switches, and application-specific modules including multi-layer, multi-chip modules, among others. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

Apparatus disclosed herein implement a fast transient precision current limiter such as may be included in an electronic voltage regulator. The current limiter includes two current sense element/current clamp control loops. A fast response time control loop first engages and clamps a current spike. A precision control loop then engages to more accurately clamp the output current to a programmed set point by matching component electrical characteristics of a precision current sense element to those of a pass element, including a pass transistor.

By way of illustration and not of limitation, the accompanying figures show specific aspects in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The aspects illustrated are described in sufficient detail to enable those skilled in the art to practice the teachings disclosed herein. Other aspects may be used and derived therefrom, such that structural and logical substitutions and changes may be made without departing from the scope of this disclosure. This Detailed Description, therefore, is not to be taken in a limiting sense. The breadth of various aspects is defined by the appended claims and the full range of equivalents to which such claims are entitled.

Such aspects of the inventive subject matter may be referred to herein individually or collectively by the term "invention" merely for convenience and without intending to voluntarily limit this application to any single invention or inventive concept, if more than one is in fact disclosed. Thus, although specific aspects have been illustrated and described herein, any arrangement calculated to achieve the same purpose may be substituted for the specific aspects shown. This disclosure is intended to cover any and all adaptations or variations of various aspects.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. An electronic current-limiting apparatus, comprising:
   a pass element to receive a voltage regulation control input signal on a voltage regulation control input path and to allow a magnitude of current flow through the pass element, the magnitude of current flow being based on a magnitude of the voltage regulation control input signal;
   a fast transient feedback circuit communicatively coupled to the voltage regulation control input path to receive the voltage regulation control input signal, to sense a first over-current condition, and to decrease the magnitude of the voltage regulation control input signal in response to sensing the first over-current condition; and
   a precision feedback circuit communicatively coupled to the voltage regulation control input path to receive the voltage regulation control input signal, to sense a second over-current condition, and to decrease the magnitude of the voltage regulation control input signal in response to sensing the second over-current condition, the precision feedback circuit to more accurately control the second over-current condition than control provided by the fast transient feedback circuit for the first over-current condition by correcting for a component characteristic mismatch between the pass element and at least one component of the precision feedback circuit, the precision feedback circuit including a reference current source.

2. The electronic current-limiting apparatus of claim 1, the fast transient feedback circuit further comprising:
   a fast transient current sense element communicatively coupled to the voltage regulation control input path to receive the voltage regulation control input signal and to generate a fast transient feedback sense current ISENSE_F proportional to the magnitude of current flow through the pass element; and
   a current comparator communicatively coupled to an output of the fast transient current sense element to compare ISENSE_F to a reference current and to generate a current clamp control signal CC_F.

3. The electronic current-limiting apparatus of claim 2, the fast transient feedback circuit further comprising:
   a current mirror communicatively coupled between the fast transient current sense element and the current comparator to generate an attenuated sense current of ratio 1/N(ISENSE_F) for comparison to the reference current.

4. The electronic current-limiting apparatus of claim 2, the fast transient feedback circuit further comprising:
   an over-current clamp communicatively coupled to an output of the current comparator to receive the current clamp control signal CC_F and to decrease the magnitude of the voltage regulation control input signal such as to decrease the magnitude of the current flow through the pass element associated with the first over-current condition.

5. The electronic current-limiting apparatus of claim 1, the precision feedback circuit further comprising:
   a precision current sense element communicatively coupled to the voltage regulation control input path to receive the voltage regulation control input signal and to generate a precision feedback current sense signal ISENSE_PS proportional to the magnitude of current flow through the pass element;
   an element matching circuit with a first input communicatively coupled to an output of the precision current sense element and a second input communicatively coupled to a voltage regulation output path to generate a precision feedback sense current ISENSE_P; and a negative feedback element communicatively coupled between an output of the element matching circuit and the first input to cause a signal at the first input to track an output voltage and to thereby compensate for at least one component characteristic mismatch between the pass element and the precision current sense element.

6. The electronic current-limiting apparatus of claim 5, the precision current sense element having a geometrical size that is an integer semiconductor finger fraction of the pass element and the element matching circuit being a signal comparator.

7. The electronic current-limiting apparatus of claim 5, the precision feedback circuit further comprising:

a current comparator communicatively coupled to an output of a signal comparator to compare the precision feedback sense current ISENSE_P to a reference current and to generate a current clamp control signal CC_P.

8. The electronic current-limiting apparatus of claim 7, the precision feedback circuit further comprising:

a current ratio apparatus communicatively coupled between the output of the signal comparator and the current comparator to create an attenuated sense current of ratio 1/N(ISENSE_P) for comparison to the reference current.

9. The electronic current-limiting apparatus of claim 7, the precision feedback circuit further comprising:

an over-current clamp communicatively coupled to the current comparator to receive the current clamp control signal CC_P and to decrease the magnitude of the voltage regulation control input signal such as to decrease the magnitude of the current flow through the pass element associated with the second over-current condition.

10. An electronic current-limiting apparatus, comprising:

a pass transistor to receive a voltage regulation control input signal on a voltage regulation control input path at a gate terminal and to allow a magnitude of current flow through a current channel associated with the pass transistor, the current flow based on a magnitude of the voltage regulation control input signal;

a fast transient feedback circuit communicatively coupled to the voltage regulation control input path to receive the voltage regulation control input signal, to sense a first over-current condition, and to decrease the magnitude of the voltage regulation control input signal in response to sensing the first over-current condition;

a precision feedback circuit communicatively coupled to the voltage regulation control input path to receive the voltage regulation control input signal, to sense a second over-current condition, and to decrease the magnitude of the voltage regulation control input signal in response to sensing the second over-current condition, the precision feedback circuit to more accurately control the second over-current condition than control provided by the fast transient feedback circuit for the first over-current condition by compensating for at least one component characteristic mismatch between the pass transistor and a current sense transistor in the precision feedback circuit, wherein the precision feedback circuit includes:

a precision current sense transistor communicatively coupled to the voltage regulation control input path to receive the voltage regulation control input signal to generate a precision feedback current sense signal proportional to the magnitude of current flow through the pass transistor;

an operational transconductance amplifier (OTA) with a first input communicatively coupled to an output of the precision current sense transistor and a second input communicatively coupled to a voltage regulation output path to generate a precision feedback sense current;

a characteristic matching feedback transistor communicatively coupled between an output of the OTA and the first input to cause a signal at the first input to track a regulator output voltage and to thereby compensate for at least one component characteristic mismatch between the pass transistor and the precision current sense transistor;

a reference current source to generate a reference current; and a precision loop transistor gate-coupled to the output of the OTA and channel-coupled between a voltage rail and the reference current source to receive the precision feedback sense current at the gate of the precision loop transistor and to generate an attenuated sense current for comparison to the reference current.

11. The electronic current-limiting apparatus of claim 10, the fast transient feedback circuit further comprising:

a fast transient current sense transistor communicatively coupled to the voltage regulation control input path to receive the voltage regulation control input signal and to generate a fast transient sense current ISENSE_F proportional to the magnitude of current flow through the pass transistor;

an over-current clamp transistor channel-coupled to the voltage regulation control input path to clamp the voltage regulation control input signal such as to decrease the magnitude of the current flow through the pass transistor during the first over-current condition when a magnitude of at least one of the fast transient sense current ISENSE_F or an attenuated sense current 1/N(ISENSE_F) exceeds a reference current I(REF_F); and a reference current source communicatively coupled to a gate of the over-current clamp transistor to generate the reference current I(REF_F).

12. The electronic current-limiting apparatus of claim 11, the fast transient feedback circuit further comprising:

a current mirror communicatively coupled to the fast transient current sense transistor to receive ISENSE_F at a current mirror source transistor and to generate the attenuated sense current 1/N(ISENSE_F) through a current channel of a current mirror output transistor, the current channel of the current mirror output transistor configured in series with the reference current source.

13. The electronic current-limiting apparatus of claim 10, the precision current sense transistor having a geometrical size that is an integer semiconductor finger fraction of the pass transistor.

14. The electronic current-limiting apparatus of claim 10, the precision feedback circuit further comprising:

an over-current clamp transistor gate-coupled to a node between the reference current source and the precision loop transistor to be driven to conduct during the second over-current condition when the attenuated sense current is greater than the reference current and to decrease the magnitude of the voltage regulation control input signal such as to decrease the magnitude of the current flow through the pass transistor associated with the second over-current condition.

15. A current-limited voltage regulator, comprising:
a pass element to receive a voltage regulation control input signal on a voltage regulation control input path and to allow a magnitude of current flow through the pass element, the magnitude of current flow being based on a magnitude of the voltage regulation control input signal;
a fast transient feedback circuit communicatively coupled to the voltage regulation control input path to receive the voltage regulation control input signal and to decrease the magnitude of the voltage regulation control input signal in a first over-current condition;
a precision feedback circuit communicatively coupled to the voltage regulation control input path to receive the voltage regulation control input signal, to sense a second over-current condition, and to decrease the magnitude of the voltage regulation control input signal in the second over-current condition, the precision feedback circuit to more accurately control the second over-current condition than control provided by the fast transient feedback circuit for the first over-current condition by correcting for a component characteristic mismatch between the pass element and a current sense element of the precision feedback circuit, the precision feedback circuit further including a reference current source;
a voltage divider communicatively coupled between an output of the voltage regulator and a voltage rail to provide a voltage sense signal; and
a voltage regulation error amplifier communicatively coupled to the voltage divider to receive the voltage sense signal, to compare the voltage sense signal to a reference voltage input, and to generate the voltage regulation control input signal.

16. The current-limited voltage regulator of claim 15, the fast transient feedback circuit further comprising:
a fast transient current sense element communicatively coupled to the voltage regulation control input path to receive the voltage regulation control input signal and to generate a fast transient feedback sense current ISENSE_F proportional to the magnitude of current flow through the pass element;
a current comparator communicatively coupled to an output of the fast transient current sense element to compare ISENSE_F to a reference current and to generate a current clamp control signal CC_F;
a current mirror communicatively coupled between the fast transient current sense element and the current comparator to generate an attenuated sense current of ratio 1/N(ISENSE_F) for comparison to the reference current; and
an over-current clamp communicatively coupled to an output of the current comparator to receive the current clamp control signal CC_F and to decrease the magnitude of the voltage regulation control input signal such as to decrease the magnitude of the current flow through the pass element associated with the first over-current condition.

17. The current-limited voltage regulator of claim 15, the precision feedback circuit further comprising:
a precision current sense element communicatively coupled to the voltage regulation control input path to receive the voltage regulation control input signal and to generate a precision feedback current sense signal ISENSE_PS proportional to the magnitude of current flow through the pass element;
a signal comparator with a first input communicatively coupled to an output of the precision current sense element and a second input communicatively coupled to a voltage regulation output path to generate a precision feedback sense current ISENSE_P; and
a negative feedback element communicatively coupled between an output of the signal comparator and the first input to cause a signal at the first input to track an output voltage and to thereby compensate for at least one component characteristic mismatch between the pass element and the precision current sense element.

18. The current-limited voltage regulator of claim 17, the precision feedback circuit further comprising:
a current comparator communicatively coupled to an output of the signal comparator to compare the precision feedback sense current ISENSE_P to a reference current and to generate a current clamp control signal CC_P;
a current ratio apparatus communicatively coupled between the output of the signal comparator and the current comparator to create an attenuated sense current of ratio 1/N(ISENSE_P) for comparison to the reference current; and
an over-current clamp communicatively coupled to the current comparator to receive the current clamp control signal CC_P and to decrease the magnitude of the voltage regulation control input signal such as to decrease the magnitude of the current flow through the pass element associated with the second over-current condition.

* * * * *